(12) United States Patent
Johnston et al.

(10) Patent No.: US 11,093,754 B2
(45) Date of Patent: Aug. 17, 2021

(54) METHOD, SYSTEM AND APPARATUS FOR SELECTING FRAMES OF A VIDEO SEQUENCE

(71) Applicant: CANON KABUSHIKI KAISHA, Tokyo (JP)

(72) Inventors: David Ian Johnston, Leichhardt (AU); Mark Ronald Tainsh, Pymble (AU); Sammy Chan, Beecroft (AU)

(73) Assignee: Canon Kabushiki Kaisha, Tokyo (JP)

( * ) Notice: Subject to any disclaimer, the term of this patent is extended or adjusted under 35 U.S.C. 154(b) by 159 days.

(21) Appl. No.: 16/406,955

(22) Filed: May 8, 2019

(65) Prior Publication Data

US 2019/0377957 A1    Dec. 12, 2019

(30) Foreign Application Priority Data

Jun. 6, 2018 (AU) .................................. 2018204004

(51) Int. Cl.
*G06K 9/00* (2006.01)
*G06N 3/08* (2006.01)
*G06K 9/62* (2006.01)

(52) U.S. Cl.
CPC ..... *G06K 9/00765* (2013.01); *G06K 9/00718* (2013.01); *G06K 9/00744* (2013.01); *G06K 9/628* (2013.01); *G06N 3/08* (2013.01); *G06K 2009/00738* (2013.01)

(58) Field of Classification Search
CPC ........... G06K 9/00765; G06K 9/00718; G06K 9/00744; G06K 9/628; G06K 2009/00738; G06N 3/08

USPC ....................................................... 382/224
See application file for complete search history.

(56) References Cited

U.S. PATENT DOCUMENTS

| | | | |
|---|---|---|---|
| 8,165,405 B2 | 4/2012 | Lim et al. | |
| 9,600,717 B1 | 3/2017 | Dai et al. | |
| 9,818,451 B1* | 11/2017 | Tyagi ..................... | G11B 27/34 |
| 2017/0124398 A1* | 5/2017 | Birkbeck ............... | G06K 9/224 |
| 2019/0108400 A1* | 4/2019 | Escorcia ............. | G06K 9/6215 |

OTHER PUBLICATIONS

Shou, et al., Temporal Action Localization in Untrimmed Videos via Multi-stage CNNs, Columbia University, New York, NY, Jan. 9, 2016.

* cited by examiner

*Primary Examiner* — Michael R Neff
(74) *Attorney, Agent, or Firm* — Canon U.S.A., Inc. IP Division

(57) ABSTRACT

A system and method of selecting a frame capturing a short duration action from a video. The method including receiving a sequence of frames of the video; and determining a reference frame in the sequence of frames by detecting a predetermined action captured in one of a first plurality of frames from the sequence of video frames, the first plurality of frames being sampled from the sequence of frames at a first sampling rate lower than that of the sequence of frames. The method further comprises selecting a second plurality of frames from the sequence of frames, the second plurality of frames having a location associated with the reference frame in the sequence and being selected at a second sampling rate, the second sampling rate being higher than the first sampling rate; and selecting the frame capturing the short duration action from the second plurality of frames.

21 Claims, 9 Drawing Sheets

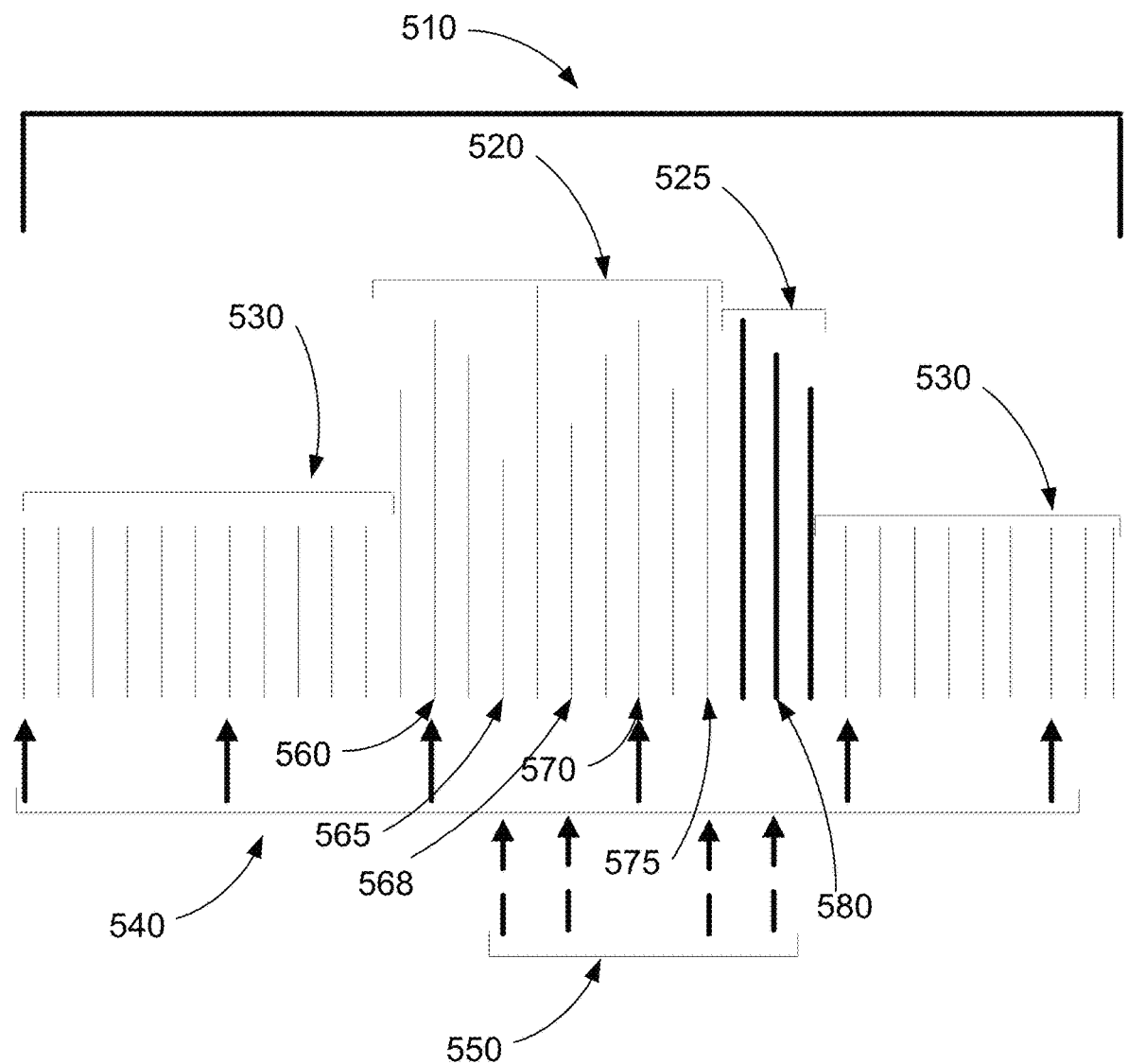
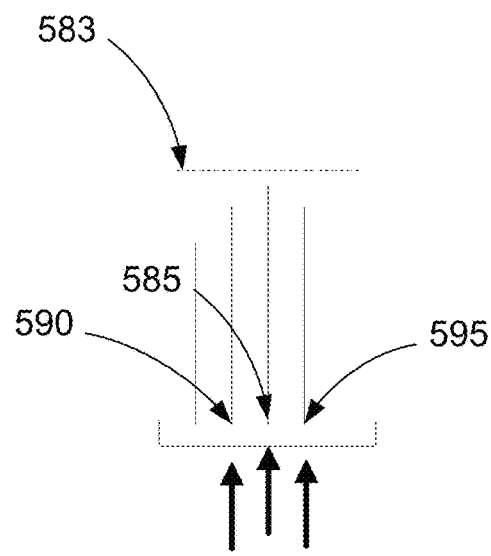
Fig. 5A
Fig. 5B

METHOD, SYSTEM AND APPARATUS FOR SELECTING FRAMES OF A VIDEO SEQUENCE

REFERENCE TO RELATED APPLICATION(S)

This application claims the benefit under 35 U.S.C. § 119 of the filing date of Australian Patent Application No. 2018204004, filed 6 Jun. 2018, hereby incorporated by reference in its entirety as if fully set forth herein.

TECHNICAL FIELD

The present disclosure relates generally to digital video processing and, in particular, to a method, system and apparatus for selecting frames of a video sequence based on subject detection. The present disclosure also relates to a computer program product including a computer readable medium having recorded thereon a computer program for selecting frames of a video sequence based on subject detection.

BACKGROUND

Video is an effective method of capturing a scene or an unfolding event. People often capture videos for birthday parties, weddings, travel and sports events. Unlike still images, video images have an advantage of capturing evolving, unstructured events, such as particular natural facial expressions, human interactions and human actions (e.g. playing, performance activities, sporting activities). It is often desirable to select a segment of a video sequence to generate video highlights, or to select individual frames from a sequence of video frames for display in the form of thumbnail images (e.g., multiple thumbnail images are combined in an animated GIF), or to use the selected frames as content in printed books. Further, it is desirable to select these outputs automatically.

With increasing demand and accessibility of cameras and personal electronics devices such as mobile phones, more and more video data is being captured and stored. Videos present an issue due to the large number of frames of a video sequence that are candidates for selection for printing or display. A video of ten minutes may have eighteen thousand frames.

A common scenario for frame selection is that a user selects a number of video sequences and requests that a selection system process the selected video sequences to select frames for printing or display or alternatively select video sequences. An example is a user providing a set of video sequences captured within a particular year and requesting a photobook for that year made up of frames selected from the selected video sequences. The user expects the selection system to operate in a timely manner. The user might expect, for example, that the selection system can process an hour long set of video sequences in less than ten minutes. Such an expectation presents a challenge when the processing executes on a device such as a personal computer and especially a camera or other mobile device.

Adding to the performance cost is the use of machine learnt algorithms to detect desirable actions that are weighted highly in selection. Machine learnt algorithms, and in particular deep neural networks, involve a large number of calculations and take a relatively long time to run. This is an additional burden on the processing.

SUMMARY

It is an object of the present disclosure to substantially overcome, or at least ameliorate, one or more disadvantages of existing arrangements.

One aspect of the present disclosure provides a method of selecting at least one frame capturing a short duration action from a video, the method comprising: receiving a sequence of frames of the video; determining a reference frame in the sequence of frames by detecting a predetermined action captured in one of a first plurality of frames from the sequence of video frames, the first plurality of frames being sampled from the sequence of frames at a first sampling rate lower than that of the sequence of frames; selecting a second plurality of frames from the sequence of frames, the second plurality of frames having a location associated with the reference frame in the sequence and being selected at a second sampling rate, the second sampling rate being higher than the first sampling rate; and selecting the at least one frame capturing the short duration action from the second plurality of frames.

In another aspect, the first sampling rate is according to a duration of the predetermined action.

In another aspect, the first sampling rate is determined based on a duration of the short duration action.

Another aspect of the present disclosure provides a method of selecting a frame capturing a short duration action from a video, the method comprising: receiving a sequence of frames of the video; determining a reference frame in the sequence of frames by detecting a predetermined action captured in one of a first plurality of frames from the sequence of video frames, the first plurality of frames being sampled from the sequence of frames at a first sampling rate determined according to a duration of the predetermined action; selecting a second plurality of frames from the sequence of frames, the second plurality of frames having a location associated with the reference frame in the sequence and being selected at a second sampling rate, the second sampling rate being higher than the first sampling rate and determined based on a duration of the short duration action; and selecting the frame capturing the short duration action from the second plurality of frames.

In another aspect, the method further comprises receiving a processing budget for the sequence of video data and a plurality of predetermined actions, each of the predetermined actions having a corresponding first sampling rate; and selecting one or more predetermined actions from the plurality of predetermined actions according to a comparison of the processing budget and an estimate of processing time of the sequence of frames, the processing time determined using the corresponding first sampling rate of the selected one or more predetermined actions.

In another aspect, the method further comprises: matching the predetermined action in the reference frame to one of a plurality of predetermined actions, each of the predetermined actions having a corresponding search direction and second sampling rate; and selecting the second plurality of frames from the sequence of video frames using the corresponding search direction and second sampling rate of the matched predetermined action.

In another aspect, the reference frame and the frame capturing the short duration action are classified using different thresholds wherein the threshold for the reference frame is lower than the threshold for the frame capturing the short duration action; and determining the reference frame comprises determining if a confidence score associated with detection of the predetermined action meets a threshold.

In another aspect, frames adjacent to the reference frame are used to determine a classification of the reference frame; and a classification matching threshold for the reference frame is varied according to a classification for the adjacent frames.

In another aspect, selecting the frame capturing the short duration action comprises prioritising and filtering the second plurality of frames based on image quality and to avoid duplication.

In another aspect, the reference frame is located using a first convolutional neural network and the frame capturing the short duration action is selected using a second neural network, the second convolutional neural network having higher accuracy than the first neural network.

In another aspect, the reference frame and the frame capturing the short duration action are decoded at a resolution matching an input dimension of a first convolutional neural network and a second convolutional neural network respectively.

In another aspect, the second sampling rate is determined based on a type of the predetermined action detected in the reference frame.

In another aspect, the steps of determining a reference frame, selecting the second plurality of frames and selecting the frame capturing the short duration action are implemented in real-time as the video is captured.

In another aspect, the method further comprises receiving a required processing time for the video via an interface of an electronic device, wherein the first sampling rate is determined according to the duration of the predetermined action and the required processing time.

In another aspect, the method further comprises determining a required processing time for the video if a user is interacting with an interface of an electronic device reproducing the video, the required processing time being a proportion of a length of the video.

In another aspect, the method further comprises determining a short duration action unlikely to be detected by operation of the method, and displaying indication that the short duration action is unlikely to be detected on an electronic device capturing or reproducing the video.

In another aspect, the short duration action unlikely to be detected by operation of the method is determined based upon a processing budget and a first sampling rate corresponding to a predetermined action associated with the short duration action.

In another aspect, the method further comprises receiving indication of a theme associated with the video sequence, wherein the first sampling rate is determined based upon duration of predetermined actions relevant to the theme.

In another aspect, the theme is received by user input at an interface of an electronic device executing the method.

In another aspect, the theme is determined by inputting the video to a classifier.

Another aspect of the present disclosure provides a non-transitory computer-readable medium storing a program to implement a method of selecting at least one frame capturing a short duration action from a video, the program comprising: code for receiving a sequence of frames of the video; code for determining a reference frame in the sequence of frames by detecting a predetermined action captured in one of a first plurality of frames from the sequence of video frames, the first plurality of frames being sampled from the sequence of frames at a first sampling rate lower than that of the sequence of frames; code for selecting a second plurality of frames from the sequence of frames, the second plurality of frames having a location associated with the reference frame in the sequence and being selected at a second sampling rate, the second sampling rate being higher than the first sampling rate; and code for selecting the at least one frame capturing the short duration action from the second plurality of frames. Image capture device.

Another aspect of the present disclosure provides an image capture device, configured to: capture a sequence of frames of a video; and execute a software program on a graphics processing unit, the program configured to perform a method comprising: determining a reference frame in the sequence of frames by detecting a predetermined action captured in one of a first plurality of frames from the sequence of frames, the first plurality of frames being sampled from the sequence of frames at a first sampling rate lower than that of the sequence of frames; selecting a second plurality of frames from the sequence of frames, the second plurality of frames having a location associated with the reference frame in the sequence and being selected at a second sampling rate, the second sampling rate being higher than the first sampling rate; and selecting at least one frame capturing the short duration action from the second plurality of frames.

Another aspect of the present disclosure provides a system comprising: a processor; and a memory device storing a software program for directing the processor to perform a method comprising the steps of: receiving a sequence of frames of a video; determining a reference frame in the sequence of frames by detecting a predetermined action captured in one of a first plurality of frames from the sequence of frames, the first plurality frames being sampled from the sequence of frames at a first sampling rate lower than that of the sequence of frames; selecting a second plurality of frames from the sequence of frames, the second plurality of frames having a location associated with the reference frame in the sequence and being selected at a second sampling rate, the second sampling rate being higher than the first sampling rate; and selecting at least one frame capturing the short duration action from the second plurality of frames.

Another aspect of the present disclosure provides a non-transitory computer-readable medium storing a program to implement a method of selecting a frame capturing a short duration action from a video, the program comprising: code for receiving a sequence of frames of the video; code for determining a reference frame in the sequence of frames by detecting a predetermined action captured in one of a first plurality of frames from the sequence of video frames, the first plurality of frames being sampled from the sequence of frames at a first sampling rate determined according to a duration of the predetermined action; code for selecting a second plurality of frames from the sequence of frames, the second plurality of frames having a location associated with the reference frame in the sequence and being selected at a second sampling rate, the second sampling rate being higher than the first sampling rate and determined based on a duration of the short duration action; and code for selecting the frame capturing the short duration action from the second plurality of frames. Image capture device.

Another aspect of the present disclosure provides an image capture device, configured to: capture a sequence of frames of a video; and execute a software program on a graphics processing unit, the program configured to perform a method comprising: determining a reference frame in the sequence of frames by detecting a predetermined action captured in one of a first plurality of frames from the sequence of frames, the first plurality of frames being sampled from the sequence of frames at a first sampling rate determined according to a duration of the predetermined action; selecting a second plurality of frames from the sequence of frames, the second plurality of frames having a location associated with the reference frame in the sequence and being selected at a second sampling rate, the second sampling rate being higher than the first sampling rate and determined based on a duration of the short duration action; and selecting the frame capturing the short duration action from the second plurality of frames.

Another aspect of the present disclosure provides a system comprising: a processor; and a memory device storing a software program for directing the processor to perform a method comprising the steps of: receiving a sequence of frames of a video; determining a reference frame in the sequence of frames by detecting a predetermined action captured in one of a first plurality of frames from the sequence of frames, the first plurality frames being sampled from the sequence of frames at a first sampling rate determined according to a duration of the predetermined action; selecting a second plurality of frames from the sequence of frames, the second plurality of frames having a location associated with the reference frame in the sequence and being selected at a second sampling rate, the second sampling rate being higher than the first sampling rate and determined based on a duration of the short duration action; and selecting the frame capturing the short duration action from the second plurality of frames.

Other aspects are also disclosed.

BRIEF DESCRIPTION OF THE DRAWINGS

One or more embodiments of the invention will now be described with reference to the following drawings, in which:

FIGS. 5A and 5B show examples of sampling video frames and processing the samples;

DETAILED DESCRIPTION INCLUDING BEST MODE

Figure 1A:
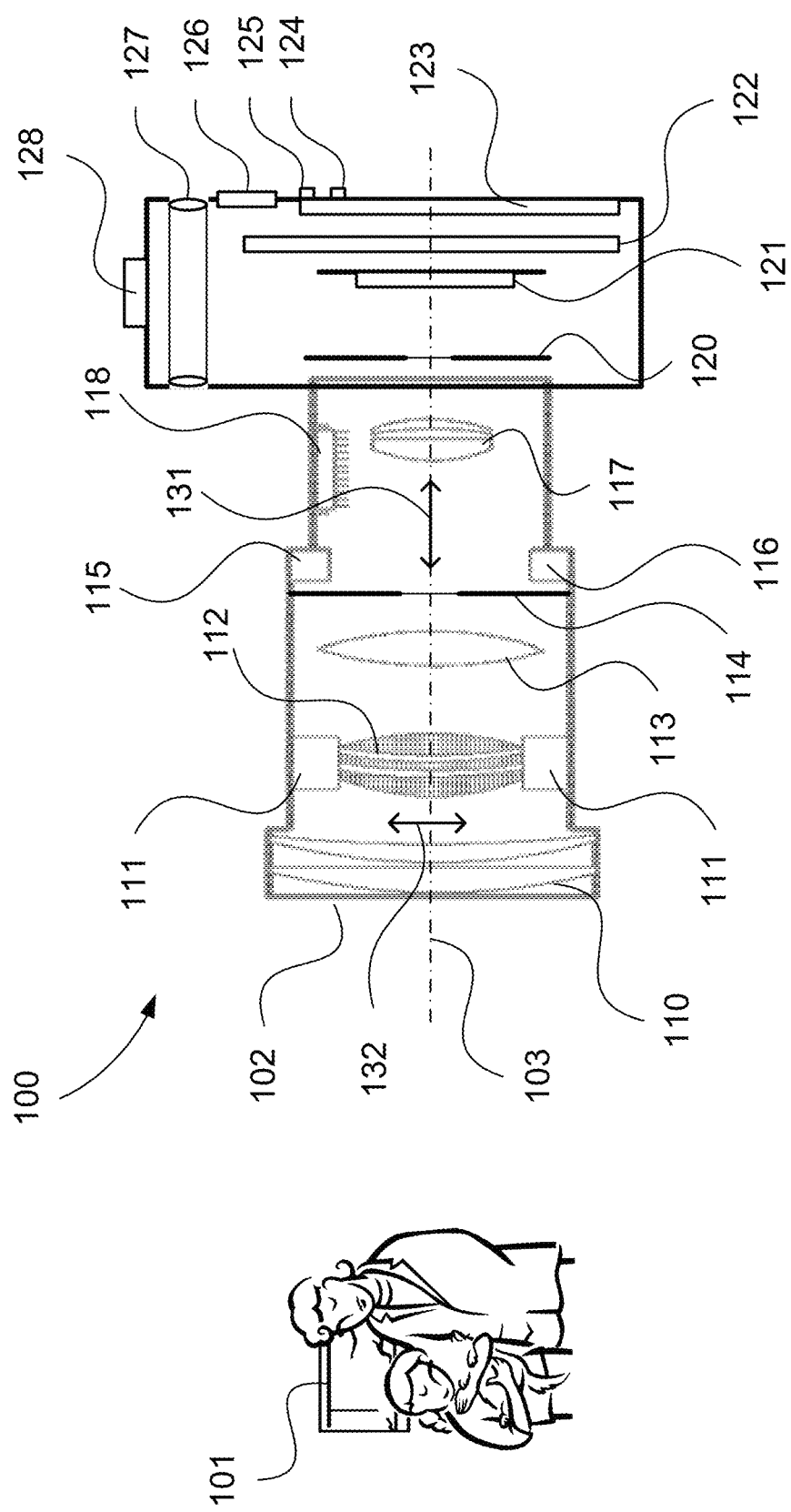
FIG. 1A is a diagram of an image capture system capable of shooting both still images and video sequences.

Where reference is made in any one or more of the accompanying drawings to steps and/or features, which have the same reference numerals, those steps and/or features have for the purposes of this description the same function(s) or operation(s), unless the contrary intention appears.

The methods described relate to selecting a frame containing a desired action from a video sequence. Selection of an appropriate frame can be used in selecting video highlights, sorting video libraries and the like.

FIG. 1A is a cross-section diagram of an image capture system 100 capable of shooting both still images and video sequences, upon which methods to be described can be practiced. In the general case, the image capture system 100 may be an image capture device such as a digital video camera (also referred to as a camcorder), or a personal electronics device having an integrated camera, for example a smartphone or a tablet device. Nevertheless, the methods to be described may also be performed on higher-level devices such as desktop computers, server computers, and other such devices with significantly larger processing resources.

The image capture system 100 will be referred to below as the "camera system 100", the "camera 100" or the "video capture device 100". The terms "image" and "frame" are also used interchangeably in the following description.

As seen in FIG. 1A, the camera system 100 comprises an optical system 102 which receives light from a scene 101 and forms an image on a sensor 121. The sensor 121 comprises a two-dimensional array of pixel sensors which measure the intensity of the image formed on it by the optical system as a function of position. The operation of the camera 100, including user interaction and all aspect of reading, processing and storing image data from the sensor 121 is coordinated by a main controller 122 which comprises a special purpose computer system. The system 100 is considered in detail below. The user is able to communicate with the controller 122 via a set of buttons including a shutter release button 128, used to initiate focus and capture of image data, and other general and special purpose buttons 124, 125, 126. The buttons 124-126 may provide direct control over specific camera functions such as flash operation or support interaction with a graphical user interface presented on a display device 123. The display device 123 may also have a touch screen capability to further facilitate user interaction. Using the buttons and controls it is possible to control or modify the behaviour of the camera 100. Typically, it is possible to control capture settings such as the priority of shutter speed or aperture size when achieving a required exposure level, or the area used for light metering, use of flash, ISO speed, options for automatic focusing and many other photographic control functions. Further, it is possible to control processing options such as the colour balance or compression quality. The display 123 is typically also used to review the captured image or video data. It is common for a still image camera to use the display 123 to provide a live preview of the scene, thereby providing an alternative to an optical viewfinder 127 for composing prior to still image capture and during video capture.

The optical system 102 comprises an arrangement of lens groups 110, 112, 113 and 117 which can be moved relative to each other along a line 131 parallel to an optical axis 103 under control of a lens controller 118 to achieve a range of magnification levels and focus distances for the image formed at the sensor 121. The lens controller 118 may also control a mechanism 111 to vary the position, on any line 132 in the plane perpendicular to the optical axis 103, of a corrective lens group 112, in response to input from one or more motion sensors 115, 116 or the controller 122 so as to shift the position of the image formed by the optical system 102 on the sensor 121. Typically, the corrective optical element 112 is used to effect an optical image stabilisation by correcting the image position on the sensor 121 for small movements of the camera 100 such as those caused by hand-shake. The optical system 102 may further comprise an adjustable aperture 114 and a shutter mechanism 120 for restricting the passage of light through the optical system 102. Although both the aperture and shutter are typically implemented as mechanical devices they may also be constructed using materials, such as liquid crystal, whose optical properties can be modified under the control of an electrical control signal. Such electro-optical devices have the advantage of allowing both shape and the opacity of the aperture to be varied continuously under control of the controller 122.

Figure 1B:
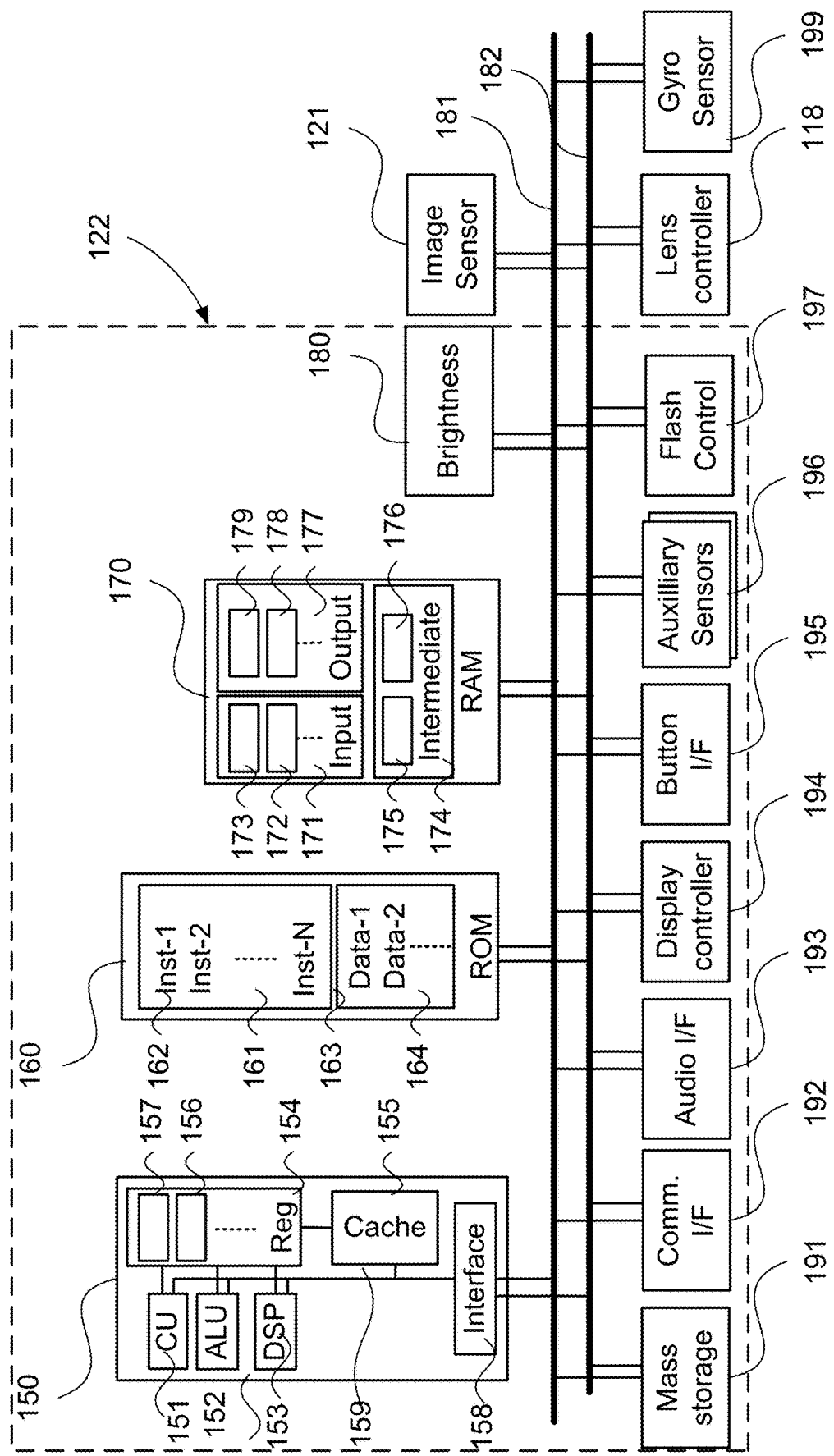
FIG. 1B is a schematic block diagram of a controller of the image capture system of FIG. 1A.

FIG. 1B is a schematic block diagram of the controller 122 of FIG. 1B, in which other components of the camera system 100 which communicate with the controller 122 are depicted as functional blocks. In particular, the image sensor 121, lens controller 118 and gyro sensor 199 are depicted without reference to their physical organisation or the image forming process and are treated only as devices which perform specific pre-defined tasks and to which data and control signals can be passed.

FIG. 1B also depicts a flash controller 197 which is responsible for operation of a strobe light that can be used during image capture in low light. Auxiliary sensors 196 may include orientation sensors that detect if the camera 100 is in a landscape of portrait orientation during image capture; other sensors that detect the colour of the ambient illumination or assist with autofocus and so on. Although the auxiliary sensors 196 are depicted as part of the controller 122, the auxiliary sensors 196 may in some implementations be implemented as separate components within the camera system 100. The gyro sensor 199 detects angular motion of the camera 100. The gyro sensor 199 may report angular motion in pitch and yaw. The gyro sensor 199 may form part of sensors 115 and/or 116 as shown on FIG. 1A, or the gyro sensor 199 may be a separate sensor. An orientation sensor (not shown) may be used to detect the angular position of the camera 100 in the roll axis. Orientation sensor information may be derived from the gyro sensor 199, or the orientation sensor may be a separate sensor. The orientation sensor may report the camera orientation in ninety (90) degree increments.

The controller 122 comprises a processing unit (or processor) 150 for executing program code, Read Only Memory (ROM) 160 and Random Access Memory (RAM) 170 as well as non-volatile mass data storage 191. The controller 122 may also comprise a dedicated brightness module 180. In addition, at least one communications interface (I/F) 192 is provided for communication with other electronic devices such as printers, displays and general purpose computers. Examples of communication interfaces include USB, IEEE1394, HDMI and Ethernet. An audio interface 193 comprises one or more microphones and speakers for capture and playback of digital audio data. A display controller 194 and button interface 195 are also provided to interface the controller 122 to the display 123 and controls present on a body of the camera 100. The components of the camera 122 are interconnected by a data bus 181 and control bus 182.

In a capture mode, the controller 122 operates to read data from the image sensor 121 and audio interface 193 and manipulate that data to form a digital representation of the scene that can be stored to a non-volatile mass data storage 191. In the case of a still image camera, image data may be stored using a standard image file format such as JPEG or TIFF, or the image data may be encoded using a proprietary raw data format that is designed for use with a complimentary software product that would provide conversion of the raw format data into a standard image file format. Such software would typically be run on a general purpose computer. For a video camera, the sequences of images that comprise the captured video are stored using a standard format such DV, MPEG, H.264. Some of these standard formats are organised into files such as AVI or Quicktime referred to as container files, while other formats such as DV, which are commonly used with tape storage, are written as a data stream. The non-volatile mass data storage 191 is used to store the image or video data captured by the camera system 100 and has a large number of realisations including but not limited to removable flash memory such as a compact flash (CF) or secure digital (SD) card, memory stick, multimedia card, miniSD or microSD card; optical storage media such as writable CD, DVD or Blu-ray disk; or magnetic media such as magnetic tape or hard disk drive (HDD) including very small form-factor HDDs such as microdrives. The choice of mass storage depends on the capacity, speed, usability, power and physical size requirements of the particular camera system 100.

Scene brightness information is provided by the brightness module 180. The brightness module 180 may take information from the image sensor 121 or the brightness module 180 may be a separate sensor. The brightness module 180 is configured to determine the correct exposure when capturing video sequences or still images. The brightness module 180 typically records a single brightness value which represents the scene brightness, often determined as defined by the photography industry standard APEX system. The brightness value may be stored as metadata alongside the captured still image or video sequence. Camera motion information from the gyro sensor 199 and orientation information from the orientation sensor, if the gyro sensor 199 and orientation sensor are used in the camera system 100, may also be stored alongside the still image or video sequence as metadata. When a video sequence is being captured, the metadata is associated with frames in the video sequence. Thus, for each frame in the video sequence there will be scene brightness information and camera motion information stored in the metadata which is particular to that frame.

The controller 122 may also include a face detection module configured to detect a face in an image formed at the sensor 121, for example as part of system program code described below.

In a playback or preview mode, the controller 122 operates to read data from the mass storage 191 and present or reproduce that data using the display 194 and audio interface 193.

The processor 150 can execute programs stored in one or both of the connected memories 160 and 170. When the camera system 100 is initially powered up, system program code 161, resident in ROM memory 160, is executed. The system program permanently stored in the ROM 160 is sometimes referred to as firmware. Execution of the firmware by the processor 150 fulfils various high level functions, including processor management, memory management, device management, storage management and user interface.

The system program code 161 may be stored in a computer readable medium, including the storage devices described below, for example. The system program code 161 is loaded into the system 100 from the computer readable medium, and then executed by the system 100. A computer readable medium having such software or computer program recorded on the computer readable medium is a computer program product.

In some instances, the system program code 161 may be supplied to the user encoded on one or more CD-ROMs and read via a corresponding drive, or alternatively may be read by the user from a network. Still further, the software can also be loaded into the system 100 from other computer readable media. Computer readable storage media refers to any non-transitory tangible storage medium that provides recorded instructions and/or data to the system 100 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the system 100. Examples of transitory or non-tangible computer readable transmission media that may also participate in the provision of software, application programs, instructions and/or data to the system 100 include radio or infra-red transmission channels as well as a network connection to another computer or networked device, and the Internet or Intranets including e-mail transmissions and information recorded on Websites and the like. The processor 150 includes a number of functional modules including a control unit (CU) 151, an arithmetic logic unit (ALU) 152, a digital signal processing engine (DSP) 153 and a local or internal memory comprising a set of registers 154 which typically contain atomic data elements 156, 157, along with internal buffer or cache memory 155. One or more internal buses 159 interconnect these functional modules. The processor 150 typically also has one or more interfaces 158 for communicating with external devices via the system data 181 and control 182 buses.

The system program 161 includes a sequence of instructions 162 through 163 that may include conditional branch and loop instructions. The program 161 may also include data which is used in execution of the program 161. The data used in execution of the program 161 may be stored as part of the instruction or in a separate location 164 within the ROM 160 or RAM 170.

In general, the processor 150 is given a set of instructions which are executed therein. The set of instructions given to the processor 150 may be organised into blocks which perform specific tasks or handle specific events that occur in the camera system 100. Typically, the system program 161 will wait for events and subsequently execute the block of code associated with that event. The execution of a block of code associated with an event may involve setting into operation separate threads of execution running on independent processors in the camera system 100, such as the lens controller 118 that will subsequently execute in parallel with the program running on the processor 150. Events may be triggered in response to input from a user as detected by the button interface 195. Events may also be triggered in response to other sensors and interfaces in the camera system 100.

The execution of a set of the instructions may require numeric variables to be read and modified. Such numeric variables are stored in RAM 170. Methods disclosed below may use input variables 171 that are stored in known locations 172, 173 in the memory 170. The input variables are processed to produce output variables 177, that are stored in known locations 178, 179 in the memory 170. Intermediate variables 174 may be stored in additional memory locations in locations 175, 176 of the memory 170. Alternatively, some intermediate variables may only exist in the registers 154 of the processor 150.

The execution of a sequence of instructions is achieved in the processor 150 by repeated application of a fetch-execute cycle. The control unit 151 of the processor 150 maintains a register called the program counter which contains the address in memory 160 of the next instruction to be executed. At the start of the fetch execute cycle, the contents of the memory address indexed by the program counter is loaded into the control unit 151. The instruction thus loaded controls the subsequent operation of the processor 150, causing for example, data to be loaded from memory 170 into processor registers, the contents of a register to be arithmetically combined with the contents of another register, the contents of a register to be written to the location stored in another register and so on. At the end of the fetch execute cycle the program counter is updated to point to the next instruction in the program 161. Depending on the instruction just executed updating the program counter may involve incrementing the address contained in the program counter or loading the program counter with a new address in order to achieve a branch operation.

Each step or sub-process in the processes of flow charts are associated with one or more segments of the program 161, and is performed by repeated execution of a fetch-execute cycle in the processor 150 or similar programmatic operation of other independent processor blocks in the camera system 100.

Selecting video frames and video highlights has improved in recent years with the increased use of machine learning algorithms that are able to identify specific objects and actions within video frames. When a desirable action is detected in a video frame, the frame or the frame and surrounding frames are candidates for selection. Other factors can also contribute to the selection of the frame or video highlight. As examples, frame blur and identified faces are both used in filtering or selecting frames. In the context of the present disclosure, the term "frame selection" relates to both "frame selection" and "highlight selection". Additionally, the frame that is selected is referred to herein in some instances as a "capture frame".

Machine learning-based algorithms that are popular in action recognition include deep neural networks and, in particular, convolutional neural networks (CNN) which are shown to have high accuracy in detection. A convolutional neural network has a model architecture that consists of a sequence of convolutional layers. Each of the convolutional layers is designed to act as a filter to generate feature maps that can identify certain visual characteristics of an input image such as colours, lines, shapes, textures, and the like. Further layers with large numbers of parameters in the architecture are trained to classify a combination of features into an object class such as a person, dog or an action pose such as kicking and the like that is of interest for detection. The architecture varies in shape and size for different convolutional neural networks. Generally, a larger architecture will achieve a higher classification accuracy but at the expense of processing time and computing resources. The same type of convolutional neural network can also have variations in the input image resolution to match the dimension of the initial convolution layer. Similarly to the effect of the architecture size, a higher input image resolution will also achieve a higher classification accuracy but at the expense of processing more data due to the extra pixels. As the size of a convolutional neural network can vary from a few million parameters to over 100 million, it is important to design a convolutional neural network with the right balance of accuracy and computational requirements for a specific application. In addition, the methods described further reduce the computational requirements without negatively impacting on the accuracy.

Figure 2A:
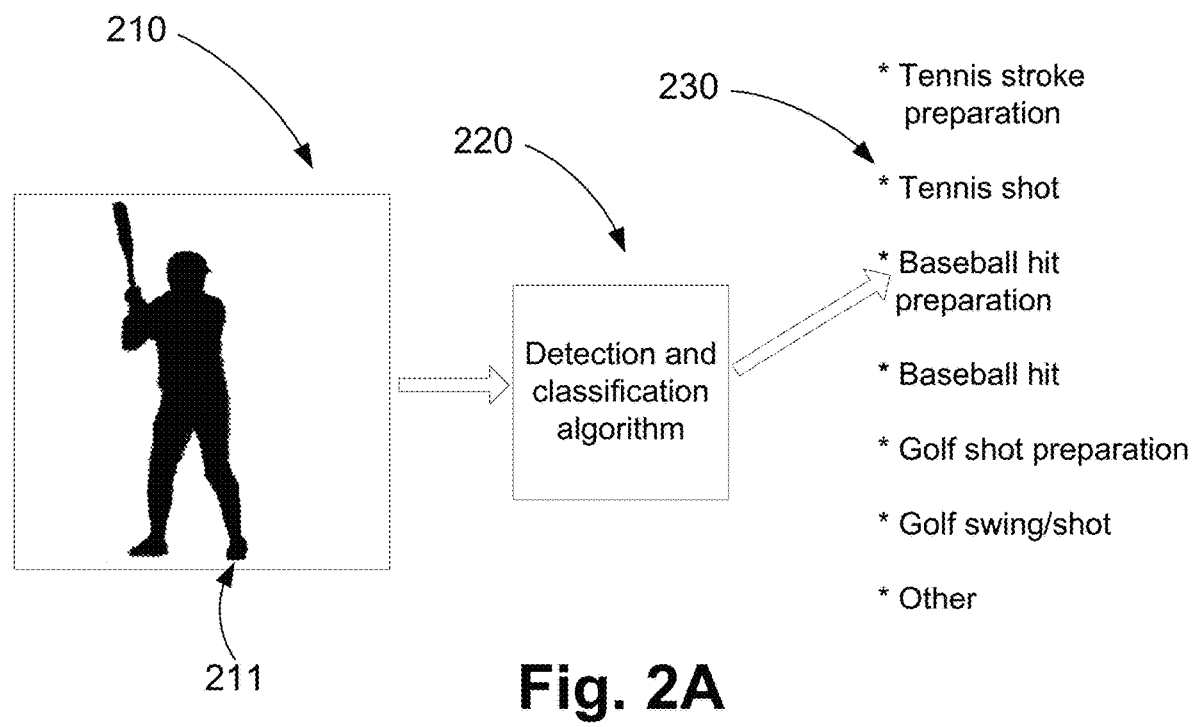
FIG. 2A shows a detection and classification algorithm processing a frame to classify the content.

FIG. 2A shows a neural network based algorithm 220 processing a frame 210 containing a batter 211 in a baseball preparation pose. The algorithm 220 detects an action and outputs a frame action classification 230. In the example of FIG. 2A the frame action classification 230 is matched to a "baseball hit preparation" classification. The neural network based algorithm 220 will also provide a classification confidence figure (not shown) that is used by the methods described herein. The algorithms also require a large number of calculations. A "Mobilenet" convolutional neural network that is intended to run on smaller computing environments and so is relatively small compared to other convolutional neural network models, requires over 500 million multiply-additions to process a single image. On systems (for example cameras or personal electronics devices) that are not optimised for convolutional neural network algorithms the number of multiply-additions represents a considerable time and processing load.

Figure 1C:
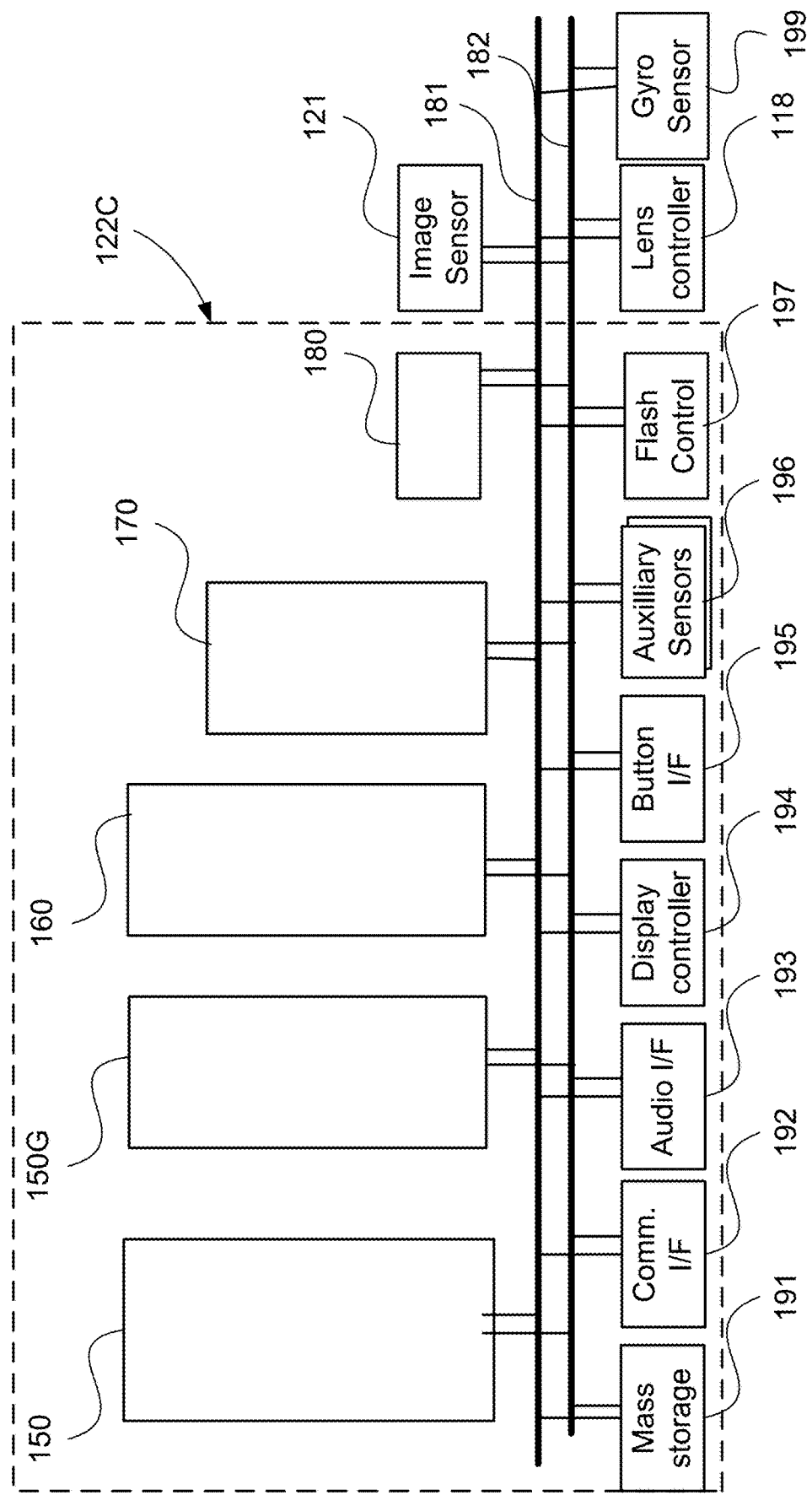
FIG. 1C shows the controller of FIG. 1B including a Graphics Processing Unit.

Convolutional neural network algorithms benefit greatly when they are run on hardware with supporting processors and modules. Graphical Processing Unit (GPU) cards such as the nVidia GeForce GTX1080Ti are suited for convolutional neural network processing and can result in up to 10 times speed improvement over similar systems that do not have the card. FIG. 1C shows a controller 122C. The controller 122C communicates and interacts with the image sensor 121, the lens controller 118 and the gyro sensor 199 via the buses 181 and 182 in a similar manner to the controller 122 of FIG. 1B. The controller 122C is similar to the controller 122 in comprising the processor 150, ROM 160, RAM 170, the brightness module 180, and components 191-196, each of which operates in a similar manner to that described in relation to FIG. 1B. However, the controller 122C also includes a GPU card 150G. In some implementations, the GPU card 150G can form part of the processor 150. For mobile devices, an application-specific integrated circuit (ASIC) coprocessor for accelerating the processing of a convolutional neural network is often built into a device, for example Apple's Neural Engine, Qualcomm's Hexagon 685 DSP core, and the like to achieve improved performance even for a mobile device.

Non-machine learning techniques can also be used to detect and classify actions and the methods described herein equally apply when algorithms other than machine learning techniques are used.

The term "algorithm network" is used herein to relate to any algorithm used to detect and classify the actions in the methods of this description. The algorithm may be a convolutional neural network or another type of algorithm such as an algorithm for human pose estimation for classifying an action based on positions and movements of detected limbs.

For processing videos, it is common for the convolutional neural network processing time to exceed per frame processing budget. For example, if there is an application requirement to process a video in real-time, which is typically processing 30 frames per second (fps) then a convolutional neural network algorithm that can process a maximum of 15 fps cannot satisfy the requirement. As such, "real-time" processing refers to processing input data at least at the same frame rate as the input data arrives. For example, if a video sequence is recorded at 30 frames per second, then "real-time" processing would require processing at a speed of at least 30 frames per second as video data is captured. Many applications require a processing speed at multiple times faster than real-time, and can require the processing frame rate to achieve hundreds of frames per second (fps). In situations processing faster than real-time, sampling is required such that only a subset of the frames will be processed and the impact on the accuracy will depend largely on the sampling algorithm. The methods described herein provide a sampling system compatible with action detection algorithms.

Figure 2B:
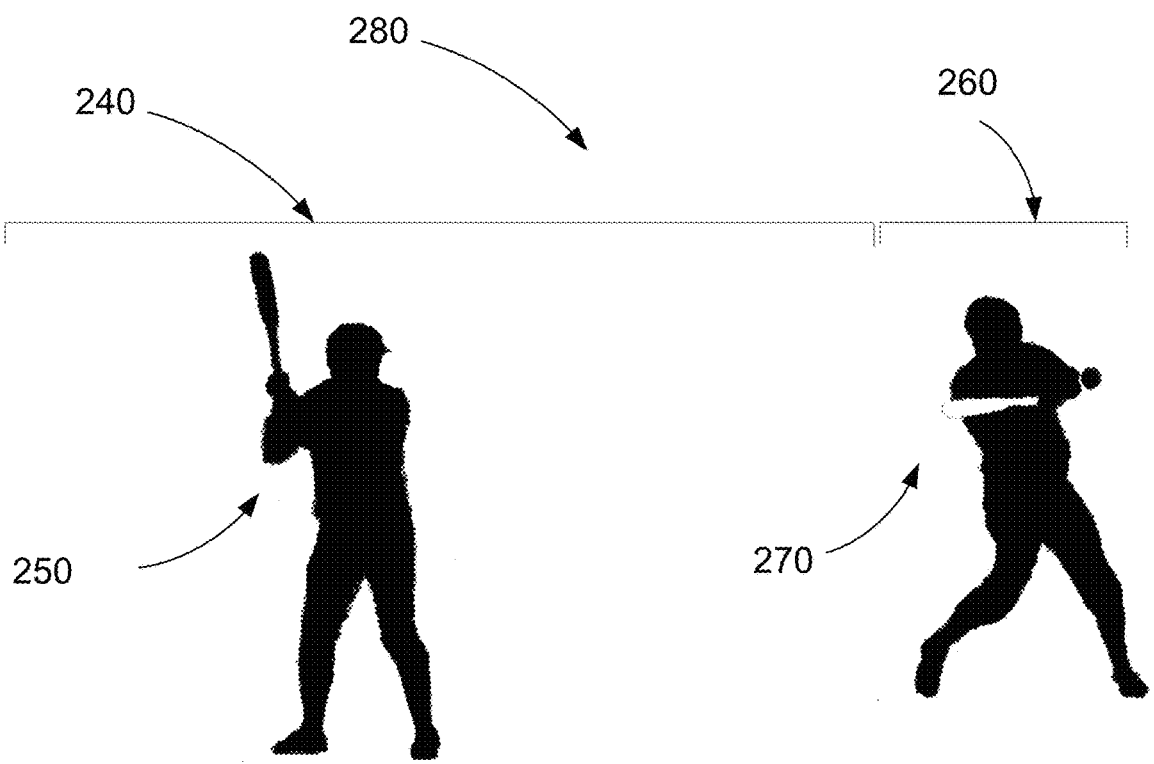
FIG. 2B shows a sequence of a predetermined action followed by a short duration action.

There are many examples of short duration actions that can be captured in videos that make portions of the video desirable as frames for frame selection. In the context of the present disclosure, a short duration action is typically in the order of less than a second or several frames in length. Examples of short duration actions can include but are not limited to hitting a ball in a sport, kicking a ball in a sport, blowing out a candle of a birthday cake, cutting the cake at a wedding. Many desirable actions may be preceded by a longer preparation action, referred to as a "predetermined action" that can be also detected by the machine learnt algorithm. For example, FIG. 2B shows a sequence 280. As shown in FIG. 2B, a baseball batter 250 is in preparation stance and a resultant stance 270 when hitting a baseball 270. The hitting action is referred to as the "short duration action". The length of time the batter is in the preparation pose is shown as a range of frames 240 and the length of time that the batter is in the process of hitting the ball is shown as a range 260. The preparation length (240) is longer than the length of time taken in hitting the ball (260).

Another example is preparation for taking a soccer penalty including the run-up and the short kicking moment and the short goalkeeper diving moment. Similar sport examples include golf preparation for a shot (predetermined action) and the shorter hitting the ball (short duration action), stroke preparation for a tennis shot (predetermined action) and the shorter shot itself (short duration action). Other non-sport examples include the preparation phase of a bridal couple assembling around a wedding cake (predetermined action) and the shorter cutting of the cake (short duration action), and preparation assembly around a birthday cake (predetermined action) and the shorter blowing out of the candles (short duration action). The term predetermined action type is used to refer to which of the predetermined actions is detected. For example, "golf preparation for shot" is a predetermined action type.

Figure 3:
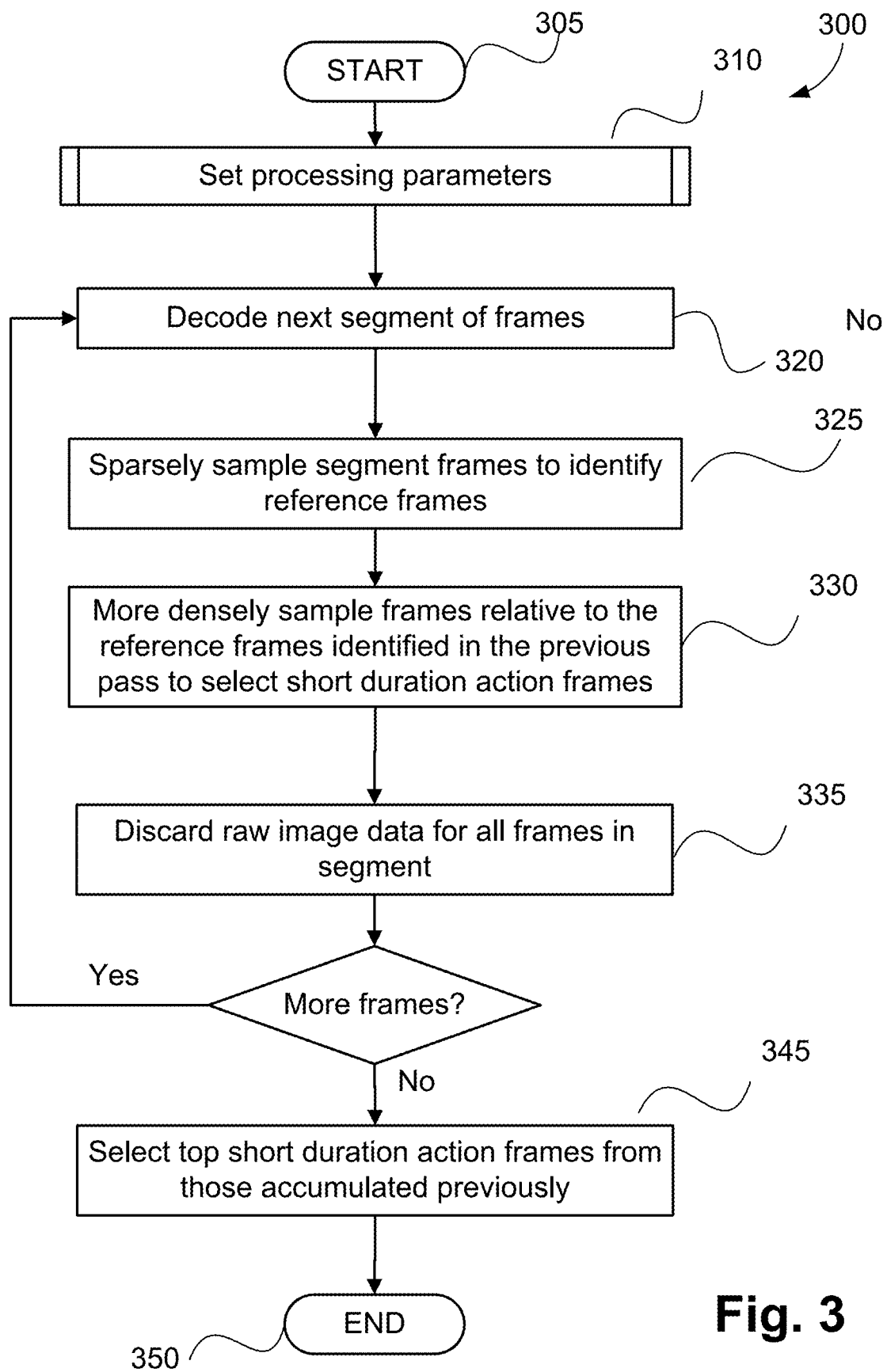
FIG. 3 is a schematic flow diagram showing a method of selecting at least one frame from a video.

FIG. 3 shows a method 300 of selecting at least one frame showing a desired action in a series of video frames. The desired action relates to a short duration action. The method 300 may be implemented in real-time as a video is captured, or after the video is captured. In some implementations, the method 300 may be implemented in response to a user command or may be implemented as pre-processing in expectation of a user command.

The method 300 determines or selects frames from a video based on detection of frames containing short duration actions. The method 300 uses multi-pass sampling suitable for key action detection. There may be other steps in selecting desirable frames of a video than those with key actions. An example includes selecting frames with faces of important people or subjects. Important subjects can be, for example, characters which often appear in a user's collection of videos, characters selected by the user using a graphical user interface, for example, by registering a face of a character using the mobile device. Steps relating to frames including important subjects are not shown in the method 300. Additionally, other steps in selecting desirable frames (capture frames) would involve filtering frames that are defective, for example frames with motion blur. Duplicated frames could also be filtered. Steps for removal of duplicate or blurred frames are known.

Before operation of the method 300 is described some of the concepts of the method 300 are introduced using FIG. 5A. FIGS. 5A and 5B is described in more detail in relation to step 325 and step 330 of the method 300 below. In FIG. 5A, a sequence 510 of frames of a video includes a subset or segment of frames 520 containing a predetermined action (e.g. baseball hit preparation) and a segment of frames 525 containing a short duration action (e.g. baseball hit). Other frames 530 do not contain any predetermined action or any short duration action. A range of arrows 540 shows six (6) sampled frames at a first sampling rate. In the example of FIG. 5A, the first sampling rate is one every six (6) video frames. A range of arrows 550 shows two sets of sampled frames with two frames in each set sampled at a second sampling rate higher than the first sampling rate. In the example of FIG. 5A the second sampling rate is one every two (2) video frames.

The method 300 may be implemented as one or more software code modules of the system program 161 resident in the ROM 160 of the camera 100 and controlled under execution of the processor 150 (or in the case of the controller 122C, the GPU 150G). Alternatively, the method 300 may be implemented on a desktop computer or the like after the input video sequence has been downloaded to the desktop computer.

The method 300 begins at a set processing parameters step 310. The step 310 receives frames of a video. The sequence of frames may be captured in real-time by the camera 100 or retrieved from a memory such as the mass storage 191. In other arrangements, for example if the camera 100 is a smartphone, the video frames may be received via a network from a remote device. The video may be reproduced on the display 123 during capture or after capture for review by a user of the camera 100. The step 310 operates to determine the processing parameters that will be applied by the method 300 based on the processing budget, the capability of the computing environment 122, and characteristics of the video from which highlight frames are to be selected. The processing budget may be set by the application based on the required response time, e.g. in minutes, expected by the user to receive the output. The processing time may be entered by the user using inputs such as the buttons 124-126 to interact with an interface displayed on the display 123. The required response time is typically a time budget for completing the processing to select the appropriate frames and is set to a short enough duration to provide a responsive user experience and an acceptable accuracy. The arrangements described are particularly suited for use cases when the user is interacting with the application 161, so that relatively quick response is expected from the application 161, for example in order of 1 minute for a 10-minute video sequence. The response time may be set as a proportion of the video time. The processing may be capped to relate to a predetermined threshold of video data. Typically, the required response time is set as a tenth of the duration of the video sequence capped at a predetermined threshold of, for example, 2 minutes. Alternatively, a user can have an option to specify time allowed for processing a particular video sequence or a collection of video sequences.

Figure 7:
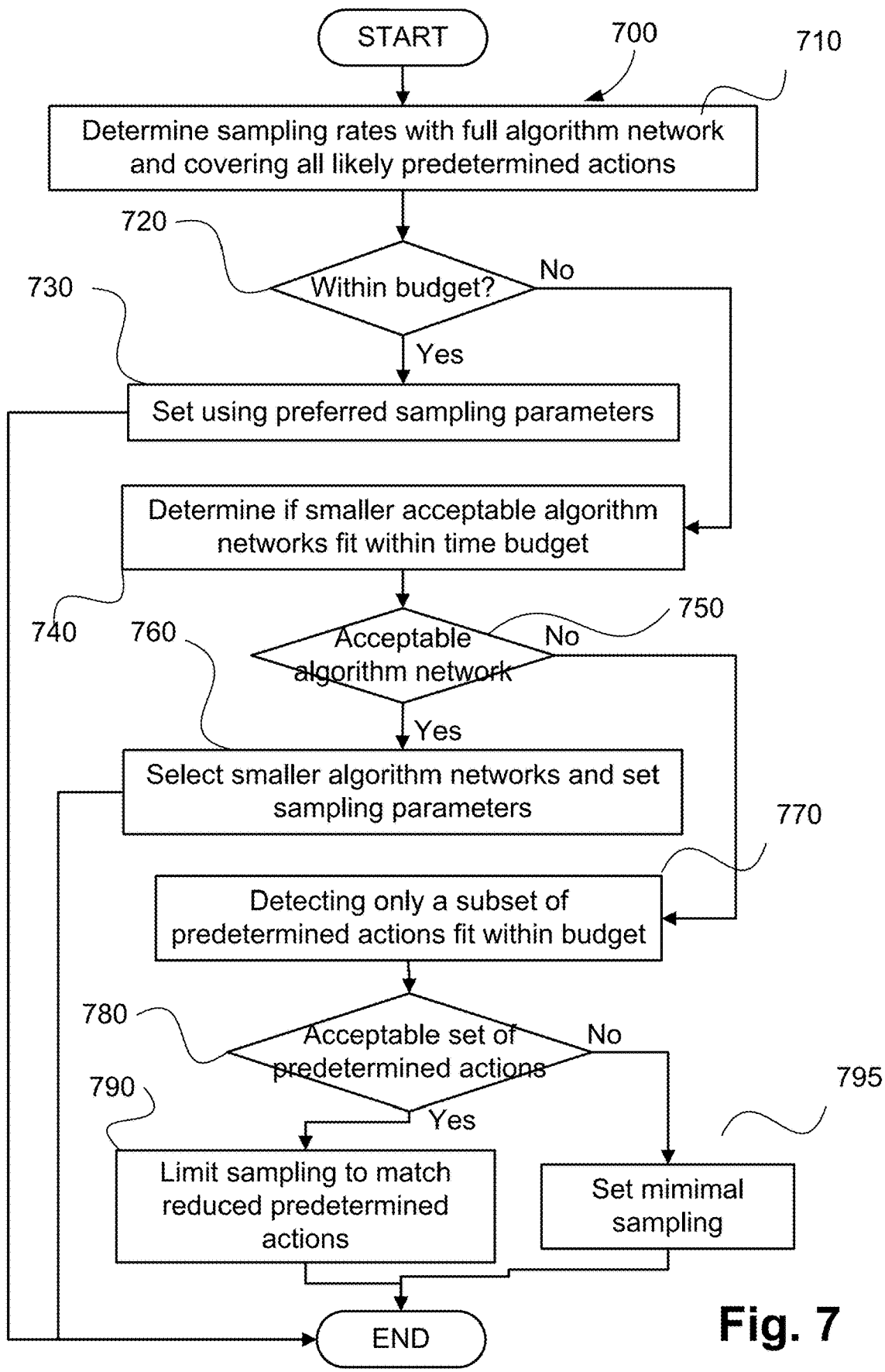
FIG. 7 is a schematic flow diagram showing a method of determining processing parameters as used in the method of FIG. 3.

Other applications may schedule the processing to select frames containing a desired action as a background task to pre-process captured videos when the camera 100 is on standby, such that no interactions with the camera and/or application are detected. An application pre-processing video data may set a higher time budget to achieve a higher accuracy without consuming excessive battery power. An even higher time budget may be set if the mobile device is on a charger. As described earlier, the capability of the camera 100 where the method is run has a great affect on the processing time. The machine's capability can also determine what machine learnt model can be used which also can determine the expected accuracy. Determining budget is described in more detail by a method of 700 of determining a processing budget, as executed at step 310, with reference to FIG. 7.

The parameters determined at step 310 include: a first sampling rate to determine a predetermined preparation action, types of actions the application would be unable to detect within the specified processing budget, and a convolutional neural network model architecture suitable for processing the video sequence within the specified processing budget. The convolutional neural network model architecture is defined using resolution of input images and a number layers used by the convolutional neural network. The types of actions the application would be unable to detect within the specified processing budget can be displayed using a graphical user interface so that the user appreciates that some short duration events are likely to be undetected under the determined processing budget. The types of action unlikely to be detected can for example be determined based on the required processing time, as described below in relation to FIG. 7.

The pixel dimension of the decoded frames is determined by the required input for the selected algorithm. In the case of convolutional neural network models, a smaller model may input smaller sized frame bitmaps. An example is the MobileNet classification convolutional neural network that has a number of different model configurations each accepting different sized image bitmap inputs. Examples are different MobileNet models accepting 224×224, 192×192, 128×128 pixel bitmaps. As described above, smaller models will be quicker to process but will have inferior detection accuracy. The pixel dimension or bitmap size is a characteristic of the selected algorithm.

After execution of step 310 the method 300 continues to a decoding step 320. At step 320 a segment of frames from the video are decoded as a batch using a suitable existing decoding method. The batch size is determined by the size of the image bitmaps that are to be provided to the detection and classification algorithm 220 and the memory of the camera 100 that is available for holding the bitmaps. The bitmaps are typically far lower resolution than the full video frame but still consume memory. In some systems, in particular embedded systems, storing all the videos frames as bitmaps in memory is not feasible. In other cases where the video is short and/or the available memory is sufficient, the batch can simply be all frames of the video. The batch size is the size of memory available for the frame bitmaps divided by the memory size of each of the frame bitmaps. The bitmap size is determined in step 310 and can relate to the size of the convolutional neural network model architecture (resolution of the input images and the number of layers in the convolutional neural network) as in the case with convolutional neural network models such as MobileNet as described above. The sequence of frames can be decoded using a single pass using a window, depending upon available memory.

Figure 4:
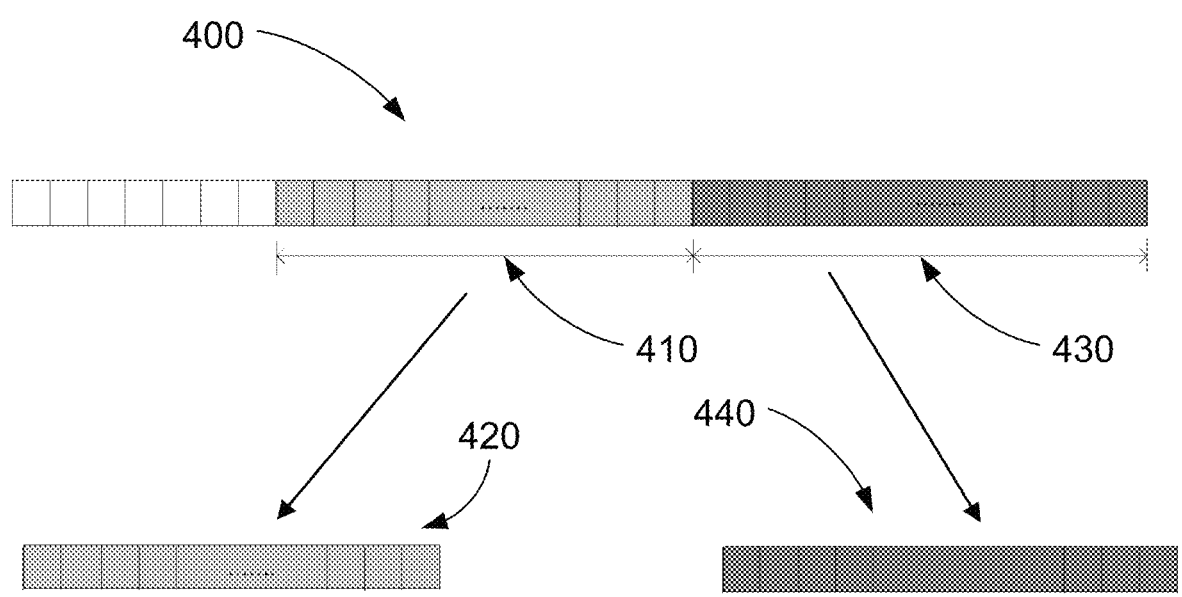
FIG. 4 shows an example of frames of a video split into segments for batch processing.

FIG. 4 shows a video 400 made up of a sequence of frames. The video 400 includes a first segment of frames 410. The first segment of frames 410 become a segment 420 processed at step 320 and a segment of frames 430 become a next segment 440 to be processed at step 320.

The method 300 continues from step 320 to a sparse sampling step 325. At step 325, the method 300 uses a convolutional neural network appropriate for the processing budget to detect predetermined actions in the samples of the frames so that it is likely that when a predetermined action is captured in the video segment then at least one sampled frame will capture the predetermined action. The step 325 is referred to as a first sampling. The sample frames in which the algorithm network 220 detects the predetermined action are referred to as "reference frames". Frames capturing a short duration action are expected to be found within a certain distance relative to the reference frame depending on the short duration action. The frames capturing the short duration action are the candidates for selection by the method 300. The identification of the short duration action frames is implemented at step 330, described below. The sampling rate at step 325 is determined at step 310 can be based the allowed processing budget as well as the expected length of time of the predetermined action.

Each of the frames sampled at step 325 is input to the selected algorithm to detect whether a predetermined action is present is that frame. The predetermined action is matched to one of a number of predetermined actions, for example as shown in FIG. 2A.

FIG. 5A shows both the first sampling to detect the predetermined action as those frames pointed to by arrows 540 and the second sample frames pointed to by the arrows 550. The first sampling rate is determined at step 310 as samples per second and quantised to the nearest frame. In FIG. 5A, the first sampling occurs at a rate of every 6 frames. The range of frames shown as 530 are not of interest in subsequent steps of the method 300 as the frames do not contain predetermined actions and accordingly do not relate to short duration actions. The algorithm network 220 does not detect either of predetermined actions or short duration actions for the frames 530. The algorithm network 220 detects the predetermined action in frames for samples 560 and 570. The frames in which the predetermine action is detected are identified as reference frames. The detection also classifies which of the possible predetermined action types is detected. For example, the classification can be baseball shot preparation or golf shot preparation. Known algorithm networks also typically provide a confidence score for the detection and classification.

In one arrangement a first sampling threshold is used and the confidence score must exceed the first sampling threshold for the frame to be marked as a reference frame. In an alternate arrangement, frames adjacent to the reference frame are used to determine a classification. If the threshold is not met, frames adjacent are also sampled. In FIG. 5B, if a frame 585 is sampled but has a confidence marginally below a first sampling threshold 583, for example is 10% below the threshold 583, adjacent frames 590 and 595 are sampled and classified using the algorithm network. If a consistent predetermined action type is detected in the adjacent frames 590 and 595, the frame 585 is classified to include a predetermined action and marked as a reference frame. Marking frame 585 can help to identify a probable false negative and to correct the false negative because a true negative result will less likely to have adjacent frames with a consistently high confidence score just below the threshold. The classification matching threshold for the reference frame is effectively varied according to a classification for the adjacent frames. The technique of marking the frame 585 based on adjacent frames reduces the false negative rate without affecting the false positive rate compared to lowering the threshold instead.

The method 300 continues from step 325 to a dense sampling step 330. At step 330, frames relative to the reference frames determined at step 325 are sampled to detect short duration action frames. The sampling executed at step 330 is referred to as the second sampling. The frames sampled relative to the reference frame can be sampled in a search direction (for example after the reference frame) corresponding to the detected (matched) predetermined action. The sampling frequency used at step 330 is higher than the sampling frequency used at step 325. The higher sampling frequency reflects that the length of the short duration action is less than the length of the related predetermined action. In FIG. 5A, reference frames 560 and 570 are detected in the first sampling step 325. In step 330, additional second sampling samples occur at frames indicated by arrows 550. In particular, the set of sampled frames 565 and 568 are sampled corresponding to the reference frame 560 and sets of frames 575 and 580 are sampled corresponding to the reference frame 570. Each set of the second pass sampled frames occurs relative to a reference frame. The samples occur at a higher sampling rate than the first sampling. Sampling the second pass at a higher rate reflects the fact that the short duration actions are shorter than the predetermined actions.

In one implementation the second sampling rate is determined based on the predetermined action type detected in the first sampling. As an example, the baseball hit short duration action is typically longer than the "blowing out the candle" short duration action and the sampling rate will be set higher in the first baseball case when the baseball hit preparation pose predetermined action is detected. In the preferred implementation the second sampling rate is set such that the rate would result in at least two (2) frames being sampled during the expected length of the short duration action. For example, the baseball hit short action is expected immediately after the baseball preparation predetermined action and the short action has a duration of typically four frames. If the second sampling aims to sample at least two frames during the short duration action, the step 330 should sample at least every second frame for the duration of the short action immediately after a reference frame detected to contain the baseball preparation predetermined action. For a different predetermined action type, the associated short duration action may have a different duration requiring a different second sampling rate. For example, if a person or people gathered behind a birthday cake are detected in the reference frame, then to detect the "blowing out the candle" short duration action, the second sampling rate is set to every $10^{th}$ to every $30^{th}$ frame so that to sample at least two frames within 60 frames corresponding to the duration of the "blowing out the candle" short duration action assuming that the "blowing out the candle" short duration action takes about 2 seconds. As such, the predetermined action type detected in the reference frame at step 325 can determine the second sampling rate for detecting the short duration action. In an alternate implementation the second sampling rate is a fixed higher rate than the first sampling rate. The second sampling rate accordingly can correspond to the predetermined action detected in the reference frame. In yet another implementation, the second sampling rate can relate to sampling all frames within a predetermined number of frames before and/or after the reference frame.

As described hereinbefore, the sampling in the second sampling step 330 occurs after the reference frame. For some predetermined actions, the short action may occur before the predetermined action. The short action occurring before the predetermined action can be the case in celebratory predetermined actions in sports. Examples include team embracing after a short duration goal is scored and "high five" celebrations after a short duration golf putt. Examples are not isolated to sport. Another example includes hugs or other interactions that often occur after a short duration blowing out of candles. If predetermined actions are detected where the short action typically occurs beforehand, the search "direction" of the second sampling is reversed to occur before the reference frame.

Figure 6A:
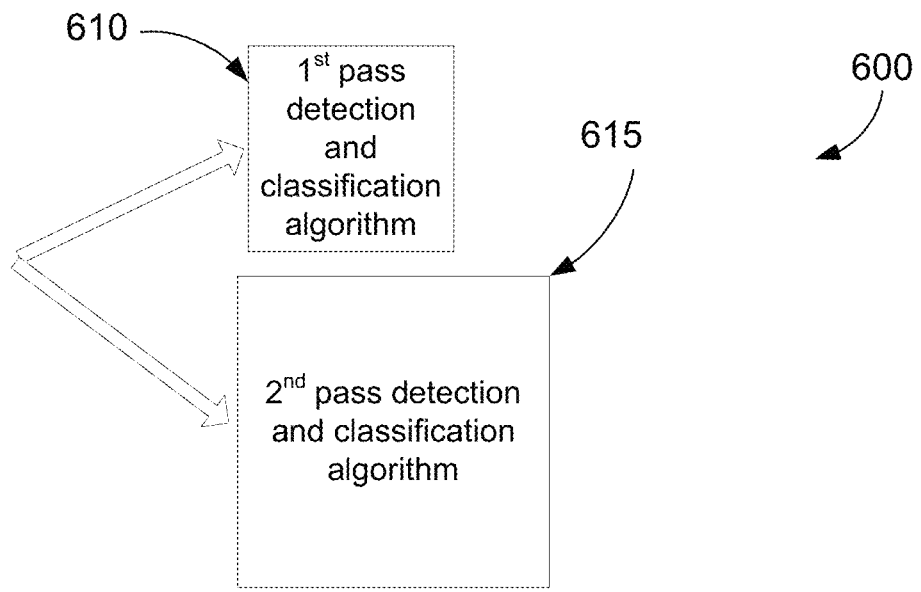
FIGS. 6A and 6B show an example of use of different detection and classification algorithms in two sampling passes as implemented in the method 300.
Figure 6B:
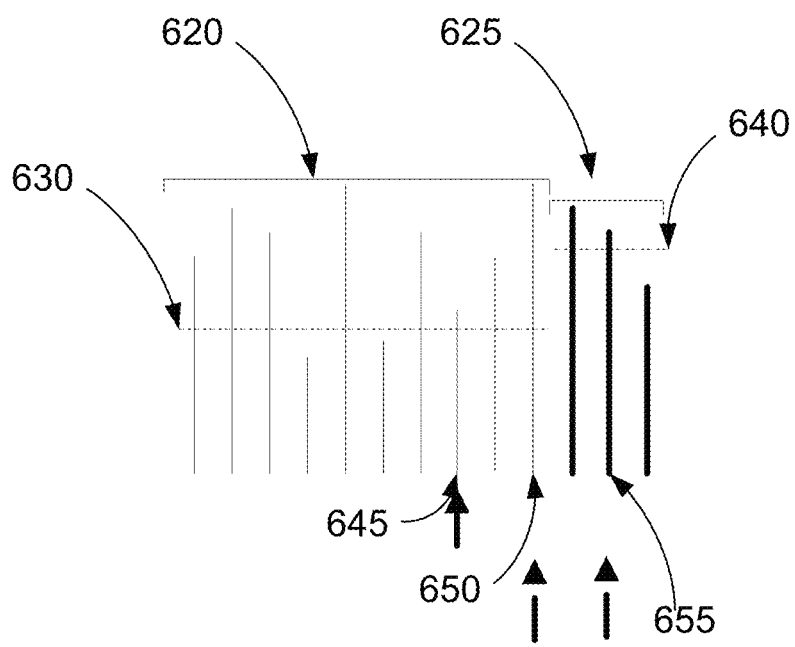

It is important that the capture frame detected in the second sampling in step 330 is classified with a high accuracy. The same level of accuracy is not required in the first sampling. FIGS. 6A and 6B shows some methods that can be used to address the two different accuracy requirements in the first and second sampling steps 325 and 330.

FIG. 6A shows an arrangement 600. As shown in FIG. 6A, two different algorithm networks 610 and 615 can be used in the first (sparse) and second (dense) sampling respectively. The larger network 615 results in a slower speed but higher accuracy compared to the smaller network 610 due to larger model architecture with more parameters for learning and the input of higher resolution images with more pixel data. The relative slowness of the algorithm network 615 used in the second sampling step 330 is not of concern because of the relative small number of predetermined actions that will be detected in a typical video. Accordingly, there will be a relatively small number of second sampling samples processed by the network 615 compared to the number of first sampling samples processed by the network 610.

In FIG. 6B, two (2) different confidence thresholds are used to classify actions in the first sampling (step 325) and the second sampling (step 330) with the second sampling threshold being higher. The different thresholds are shown with first sampling step 325 detecting a sample at a frame 645 using a threshold 630 while the second sampling step 330 samples at 650 and 655 using the higher threshold 640. The frames marked as 620 in FIG. 6B are frames with the predetermined action and the frames marked with 625 are of the short duration action. In the example of FIG. 6B, at the first sampling sample 650 the algorithm network 610 detects the predetermined action with a confidence level above the threshold 630 but below the threshold 640. The confidence level is acceptable as the sample 650 is sampled in the first sampling (step 325). For the frame 655 sampled in the second sampling, the algorithm network 615 has a confidence greater than the threshold 640 and so the frame 655 is correctly marked as a capture frame. The lower threshold 630 has an effect of reducing the number of potential false negative predetermined action classifications in the first sampling. The lower threshold 630 accordingly helps to minimise the risk of missing any short action frames as a result of not performing the second sampling due to a false positive in the first sampling. The lower threshold 630 can also potentially increase the number of false positives in the first sampling. However, the increase in false positives should not significantly affect the accuracy as the unnecessary second sampling caused by a false positive predetermined action frame classification should not result in any short action frames even though it does increase the amount of processing. As shown by FIG. 6B, the reference frame and the frames sampled using the second sampling rate can be classified using different thresholds, the threshold for the reference frame typically being the lower threshold.

The result of executing step 330 is that any short duration action frames that have been detected (capture frames) are added to an accumulated list of short duration frames. As described above, convolutional neural networks may have a number of different model configurations each accepting different sized image bitmap inputs. Accordingly, different frames (for example reference frames and frames capturing a short duration action) can be decoded or analysed at a resolution matching an input dimension of a first convolutional neural network (at step 325) and a second convolutional neural network (at step 330) respectively.

The method 300 continues from step 330 to a discarding step 335. Step 335 operates to free the segment frame resources that were allocated at step 320. The allocated segment frame resources are the bitmaps that were available for the detection and classification of actions that occurs at steps 325 and 330. Step 335 operates to discard image data for the allocated frame resources.

The method 300 continues from step 335 to a decision step 340. Step 340 executes to determine if more frames are to be analysed or processed for classification. If more frames are to be processed ("Yes" at step 340), the method 300 continues to step 320 and execution of steps 320, 325, 330 and 335 is repeated. If no additional frames are available ("no" at the decision step 340), the method 300 continues to step 345.

At step 345 the frames that were accumulated at step 330 are prioritised and the method 300 selects and outputs some or all of the accumulated frames. The listed frames output at step 330 are prioritised and the top ("best") of the listed frames are selected at step 345. Depending on the usage of the frames by an application, different prioritisation strategies may be used to select the best frames or a variety of good frames for output. For example, if an application only requires a single frame for representing a captured video, the capture frames may be prioritised based on a combination of the action detection confidence and image quality after all the capture frames are added to the list and then the top frame is selected. As another example, if an application requires to use many frames to create a slideshow, the capture frames from a single action may be prioritised locally and the top frame selected for each action. Local prioritisation allows a frame from each action to be selected and outputted as the video is being processed.

In some instances, filtering can be executed at step 345 to ensure that the output frames are of sufficient image quality and to ensure that duplicates do not occur. The frames samples at step 330 are prioritised and filtered based on image quality and to avoid duplication or near-duplication. Filtering for image quality or to avoid duplication is implemented using known techniques. Sharpness, colourfulness and composition are basic technical metrics that can provide a measure of perceived image quality. Known filtering techniques include detecting a presence of sufficiently sharp edges in the region of the detected short duration action as a measure of sharpness, determining a wide distribution of the colour histogram of the entire frame as a measure of colourfulness, assessing the position and size of the region of the detected short duration action within the frame for good image composition and the like. Image near-duplicates can be detected by comparing the colour histograms of the frames. A distance metric calculated based on the proportion of two colour histograms overlapping above a certain threshold, for example 90 percent, can be used to determine that two frames are near-duplicates and the one with the lower image quality measure may be filtered out for the selection.

The capture frames selected by the method 300 are suitable for inclusion in photo books and a sequence of frames that include the selected frame can be used as a video highlight. Other media items can also be created out of the desirable frames identified by execution of the method 300. The step 345 can include storing the selected frame in association with a photobook, annotating the frame to indicate a highlight, displaying the frame or a thumbnail of the frame to a user. The method 700 of setting the processing parameters, as executed at step 310, is described by way of example with reference to FIG. 7. The method 700 may be implemented as one or more software code modules of the system program 161 resident in the ROM 160 of the camera 100 and controlled under execution of the processor 150 (or in the case of the controller 122c, the GPU 150G).

The method 700 begins with a rate determination step 710. Step 710 operates to determines the overall time budget for the sampling steps 325 and 330 of the selection method 300. The method 300 is typically required to perform the selection within a set time period. In some circumstances the time period will be "real-time" which means that if the video is recorded at 30 frames per second the algorithm will have a per frame budget of $1/30^{th}$ of a second. In most cases a maximum processing period will be set but the method 300 will be expected to consume only as much time as is required to perform the selection process effectively. The steps that consume the time budget are the decoding of all video frames, the first sampling step 325 and the second sampling step 330. The time budget for the sampling steps determined can be the maximum processing period minus the decode time for all the video frames.

The method 700 executes to determine three (3) operating parameters:

The first sampling rate;
The algorithm networks to be used; and
The set of predetermined actions to be targeted.

At step 710 a default algorithm networks and set of predetermined actions are assumed. Step 710 step determines the first sampling rate. In a embodiment the first sampling rate is set such that at least two samples are expected to occur during a predetermined action. Each predetermined action accordingly has a corresponding first sampling rate. Typically, duration of each type of predetermined action is known in advance. For example, typical time for a baseball hit preparation pose is known to be about 5 or more seconds before the player hits the ball. Accordingly, an initial first sampling rate (sufficient to capture two samples during the predetermined action) is associated with each of the predetermined actions.

FIG. 5A shows two (2) first sampling rate samples 560 and 570 occurring in predetermined action 520. If there are a number of different predetermined actions that can be detected and classified by the algorithm network, the predetermined action with the minimum expected time length ($PE_{min}$) seconds is used to determine the first sampling rate (FSR) in samples per second. The formula of Equation (1) for determining FSR can be used:

$$FSR = 2/(\text{Expected time length of } PE_{min}) \quad (1)$$

Alternate methods of setting FSR to Equation (1) may be used. Example alternate methods include determining the mean $PE_{min}$ but also the standard deviation of the $PE_{min}$ time distribution in the calculations. In another embodiment, a FSR that would result in a period less than the expected length of the $PE_{min}$ could be used assuming that statistically a sufficient number of predetermined actions would be detected in the sampling.

The step 710 determines an estimate of the expected processing time of the video sequence with the default algorithm network and the default set of predetermined actions. In determining the time taken for the method 300 to complete, Equation (2) can be used:

$$\text{Processing time} = \text{video length secs} * \text{FSR} * \text{algorithm network processing time} + \text{time for second sampling processing} + \text{frame decoding time} \quad (2)$$

In Equation (2), the algorithm network processing time as stated previously is heavily dependent on the hardware system 122 where the method is being run. For example, convolutional neural network processing is greatly accelerated if GPUs such as the GPU 150G are available. Algorithm networks will in general have a stated number of multiply-adds which can be used to estimate the algorithm network processing time for the system 122 on which the method 300 is executed. Alternatively, the time can be measured on some reference systems and the reference figures be used to estimate the time for the system 122 on which the method 300 is executed.

In Equation (2), the time for second sampling processing depends on the number of predetermined actions that are detected. In FIG. 5A the second sampling starts at the two (2) frames 565 and 575. The second sampling only occurs if predetermined action was detected at frames 560 and 570. In one embodiment the time for second sampling processing is considered. In this case a limit on the maximum number of reference frames (RFmax) that can be detected is set based on Equation (3).

$$\text{time for second sampling processing} = \text{RFmax} * \text{algorithm network processing time} * \text{Exp2ndSamples} \quad (3)$$

In Equation (3), Exp2ndSamples is the expected number of second samples per reference frame. Exp2ndSamples is 2 if the same (FSR) formula is adopted for the second sampling rate. Otherwise, a relatively high number may be used to ensure more capture frames are detected for later selection. Alternatively, the time for second sampling processing may be ignored when determining processing time.

In Equation (3), the frame decoding time is the time taken to decode a single video frames multiplied by the number of video frames. The time taken to decode a single frame can be measured on a number of different reference systems so that a reasonable estimation can be made for the frame decoding time on the system where the method is run.

The method 700 continues from step 710 to a decision step 720. At decision step 720 the Processing time determined using Equation (2) using the default algorithm network and default predetermined actions is compared with the allowed budget. If the Processing time is larger than the budget ("No" at step 720) the method 700 proceeds to a determining step 740. If the Processing time falls within the budget ("Yes" at step 720) the method 700 proceeds to a setting step 730. The first sampling rate is effectively determined according to the duration of the predetermined action if the Processing time falls within the budget.

In step 730, the first sampling rate as determined by Equation (1) for FSR is set, the algorithm network is set to the default algorithm network, and the predetermined actions are set to the default predetermined actions set.

At step 740 alternate algorithm networks with relatively shorter processing time are considered. The default algorithm network that was used at step 710 is chosen to be the algorithm with the highest accuracy amongst a set of alternatives. The alternatives are quicker but with lower accuracy. At step 740 Equation (2) for Processing time is used with the alternative algorithm networks and the algorithm network with the highest accuracy is selected that results in a Processing time that fits within the allowed budget.

The method 700 continues from step 740 to a decision step 750. At decision step 750 the program 161 executes to determine if an acceptable algorithm network has been found. In other words, step 750 determines if the processing time has been met by the current algorithm network. If no acceptable algorithm network is found ("No") at step 750), the method 700 proceeds to a detecting step 770, described below. If an acceptable algorithm network is found ("Yes" at step 750), the method 700 proceeds to a selecting step 760. At step 760, the first sampling rate as calculated by Equation (1) for FSR is set, the algorithm network is set to the acceptable algorithm network determined at step 740, and the predetermined actions are set to the default predetermined actions set.

At step 770 predetermined actions are removed starting with the predetermined action with the shortest expected period and the formula for FSR and Processing time rerun to determine whether the Processing time falls within allowed budget. The step 770 is repeated until the Processing time falls within the allowed budget. Once the Processing time falls within the allowed budget, the method 700 considers whether the remaining set of predetermined actions is acceptable. Step 770 effectively operates to select one or more predetermined actions based on the associated first sampling rate(s) and compares the processing budget and estimated time using the associated first sampling rates. In some implementations, the step 770 can operate to inform a user of the camera 100 of predetermined actions that are unlikely to be detected based on the removed predetermined actions.

The method 700 continues from step 770 to a decision step 780. At decision step 780, if no acceptable set of predetermined actions remain ("No" at step 780), the method 700 passes to a setting step 795. At step 795 a maximum sampling rate is set that fits within the allowed budget. At the sampling rate set at step 795 all predetermined actions might not be detected. The FSR could be set to a value that makes the Processing time fall within the allowed budget using Equation (3).

If at step 780 an acceptable set of predetermined actions was found ("Yes" at step 780), then method 700 proceeds to a limiting step 790. At step 790 the first sampling rate as calculated Equation (1) is set, the algorithm network is set to the default algorithm network, and the predetermined actions are set to the actions returned from step 770.

If an application is able to provide a hint such as a limited subset of actions to expect from a video, e.g. a slideshow application in which the user has selected a birthday theme, the method 700 can be run in advance (that is before requested by a user). The hint may be given by specifying a main theme of the video by a user using an interface of an electronic device such as the buttons 124-126 and display 123 of the camera 100. The hint may be input by the user selecting an option of a menu reproduced on the display 123 for example, or by the program 161 determining the theme using a lightweight classification of the videos based on their theme or in any other manner, for example by inputting the video to a classifier. The hint may be used by the processing parameter determining method 700 to determine parameters at step 310 of the method 300 to achieve the maximum speed without losing accuracy. Use of the hint can allow the determining step 770 to only consider actions that are to be expected in the video thus potentially ignoring short actions that require high sampling rates.

If, for a particular application, the processing budget is always fixed and there is never prior knowledge of the actions to expect in the videos, the processing parameter determining method 700 may be pre-determined (executed prior to receiving a user command to implement the method 300) once and used for all videos.

The arrangements described are applicable to the computer and data processing industries and particularly for the video processing industries. As described above the arrangements described can be used for image- or video-related applications such as photobooks, identifying and/or annotating highlights, or the like.

In using a first sampling rate at step 325 to detect a reference frame using frames sampled at a rate according to a duration of a predetermined action allows the predetermined action to be detected without analysing each and every frame. However, the predetermined action can be detected without sacrificing accuracy. Further sampling frames having a location associated with the reference frame using a higher sampling rate at step 330 operates to allow detection of a short duration action with improved detection time without sacrificing accuracy. The determination of first and second sampling rates can also be used to adhere to a processing time budget, as described above. The arrangements described are accordingly particularly suitable for implementation on devices in which computational resources are limited, such as a video camera or a smartphone, and/or which include a GPU such as the GPU 150G. The methods described are also suitable for implementation of other devices such as desktop computers to reduce computational congestion and processing times.

The foregoing describes only some embodiments of the present invention, and modifications and/or changes can be made thereto without departing from the scope and spirit of the invention, the embodiments being illustrative and not restrictive.

The invention claimed is:

1. A method of selecting at least one frame capturing a target action from a video, the method comprising:
receiving a sequence of frames of the video;
determining a reference frame in the sequence of frames by detecting a predetermined action captured in one of a first plurality of frames from the sequence of frames, the first plurality of frames being sampled from the sequence of frames at a first sampling rate which is lower than that of the sequence of frames and is according to a duration of the predetermined action;
selecting a second plurality of frames from the sequence of frames, the second plurality of frames having a location associated with the reference frame in the sequence of frames and being selected at a second sampling rate, the second sampling rate being higher than the first sampling rate; and
selecting the at least one frame capturing the target action from the second plurality of frames.

2. The method according to claim 1, wherein the first sampling rate is determined based on a duration of the target action.

3. The method according to claim 1, further comprising:
receiving a processing budget for the sequence of frames and a plurality of predetermined actions, each of the predetermined actions having a corresponding first sampling rate; and selecting one or more predetermined actions from the plurality of predetermined actions according to a comparison of the processing budget and an estimate of processing time of the sequence of frames, the processing time determined using the corresponding first sampling rate of the selected one or more predetermined actions.

4. The method according to claim 1, further comprising:
matching the predetermined action in the reference frame to one of a plurality of predetermined actions, each of the predetermined actions having a corresponding search direction and second sampling rate; and
selecting the second plurality of frames from the sequence of frames using the corresponding search direction and second sampling rate of the matched predetermined action.

5. The method according to claim 1, wherein the reference frame and the frame capturing the target action are classified using different thresholds wherein the threshold for the reference frame is lower than the threshold for the frame capturing the target action; and
wherein determining the reference frame comprises determining if a confidence score associated with detection of the predetermined action meets a threshold.

6. The method according to claim 1, wherein frames adjacent to the reference frame are used to determine a classification of the reference frame; and
a classification matching threshold for the reference frame is varied according to a classification for the adjacent frames.

7. The method according to claim 1, wherein selecting the frame capturing the target action comprises prioritizing and filtering the second plurality of frames based on image quality and to avoid duplication.

8. The method according to claim 1, wherein the reference frame is located using a first convolutional neural network and the frame capturing the target action is selected using a second neural network, the second convolutional neural network having higher accuracy than the first neural network.

9. The method according to claim 1, wherein the reference frame is located using a first convolutional neural network and the frame capturing the target action is selected using a second neural network, the second convolutional neural network having higher accuracy than the first neural network, and the reference frame and the frame capturing the target action are decoded at a resolution matching an input dimension of a first convolutional neural network and a second convolutional neural network respectively.

10. The method according to claim 1, wherein the second sampling rate is determined based on a type of the predetermined action detected in the reference frame.

11. The method according to claim 1, wherein the steps of determining a reference frame, selecting the second plurality of frames and selecting the frame capturing the target action are implemented in real-time as the video is captured.

12. The method according to claim 1, further comprising receiving a required processing time for the video via an interface of an electronic device, wherein the first sampling rate is determined according to the duration of the predetermined action and the required processing time.

13. The method according to claim 1, further comprising determining a required processing time for the video if a user is interacting with an interface of an electronic device reproducing the video, the required processing time being a proportion of a length of the video.

14. The method according to claim 1, further comprising determining a target action unlikely to be detected by operation of the method, and displaying indication that the target action is unlikely to be detected on an electronic device capturing or reproducing the video.

15. The method according to claim 1, further comprising determining a target action unlikely to be detected by operation of the method, and displaying indication that the target action is unlikely to be detected on an electronic device capturing or reproducing the video, and wherein the target action unlikely to be detected by operation of the method is determined based upon a processing budget and a first sampling rate corresponding to a predetermined action associated with the target action.

16. The method according to claim 1, further comprising receiving indication of a theme associated with the video sequence, wherein the first sampling rate is determined based upon duration of predetermined actions relevant to the theme.

17. The method according to claim 1, further comprising receiving indication of a theme associated with the video sequence, wherein the first sampling rate is determined based upon duration of predetermined actions relevant to the theme, wherein the theme is received by user input at an interface of an electronic device executing the method.

18. The method according to claim 1, further comprising receiving indication of a theme associated with the video sequence, wherein the first sampling rate is determined based upon duration of predetermined actions relevant to the theme, wherein the theme is determined by inputting the video to a classifier.

19. A non-transitory computer-readable medium storing a program to implement a method of selecting at least one frame capturing a target action from a video, the program comprising:
code for receiving a sequence of frames of the video;
code for determining a reference frame in the sequence of frames by detecting a predetermined action captured in one of a first plurality of frames from the sequence of video frames, the first plurality of frames being sampled from the sequence of frames at a first sampling rate which is lower than that of the sequence of frames and is according to a duration of the predetermined action;
code for selecting a second plurality of frames from the sequence of frames, the second plurality of frames having a location associated with the reference frame in the sequence and being selected at a second sampling rate, the second sampling rate being higher than the first sampling rate; and
code for selecting the at least one frame capturing the target action from the second plurality of frames.

20. An image capture device configured to select at least one frame capturing a target action from a video, comprising:
capture a sequence of frames of a video; and
one or more processors that, when executing a software program, operates to:
determine a reference frame in the sequence of frames by detecting a predetermined action captured in one of a first plurality of frames from the sequence of frames, the first plurality of frames being sampled from the sequence of frames at a first sampling rate which is lower than that of the sequence of frames and is according to a duration of the predetermined action;
select a second plurality of frames from the sequence of frames, the second plurality of frames having a location associated with the reference frame in the sequence and being selected at a second sampling rate, the second sampling rate being higher than the first sampling rate; and select at least one frame capturing the target action from the second plurality of frames.

21. A system configured to select at least one frame capturing a target action from a video, comprising:

a processor; and a memory device storing a software program for directing the processor to perform a method comprising the steps of:

receiving a sequence of frames of a video;

determining a reference frame in the sequence of frames by detecting a predetermined action captured in one of a first plurality of frames from the sequence of frames, the first plurality frames being sampled from the sequence of frames at a first sampling rate which is lower than that of the sequence of frames and is according to a duration of the predetermined action;

selecting a second plurality of frames from the sequence of frames, the second plurality of frames having a location associated with the reference frame in the sequence and being selected at a second sampling rate, the second sampling rate being higher than the first sampling rate; and selecting at least one frame capturing the target action from the second plurality of frames.

* * * * *